H. S. WILLIAMS.
PNEUMATIC TIRE.
APPLICATION FILED OCT. 10, 1919.
1,379,887.
Patented May 31, 1921.
2 SHEETS—SHEET 1.
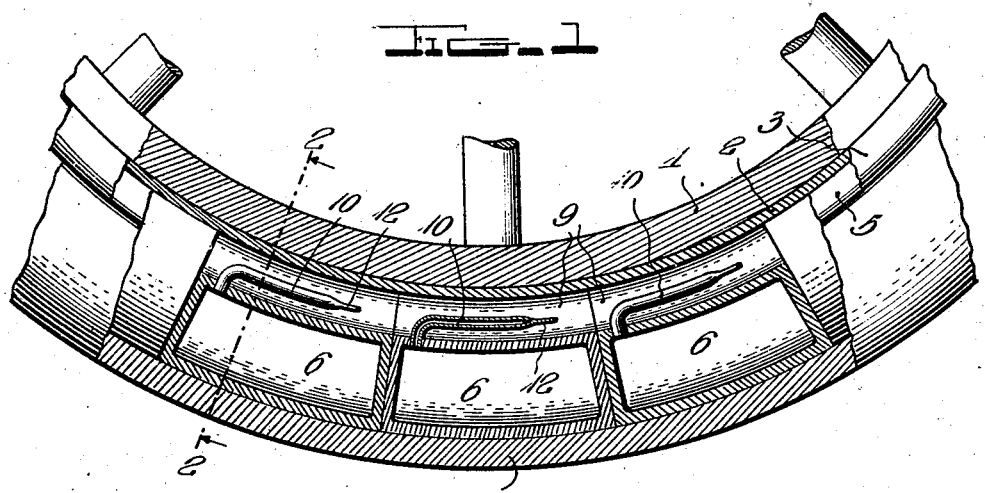
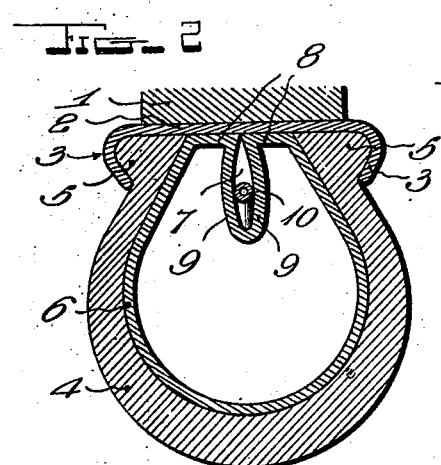
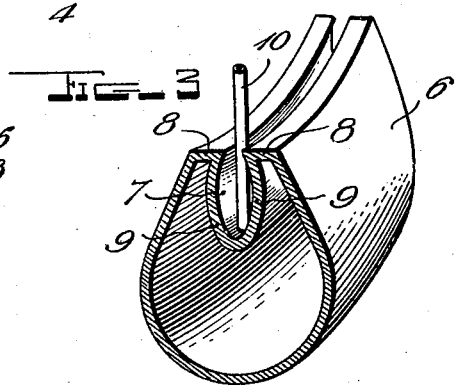
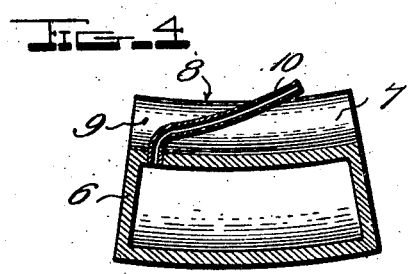
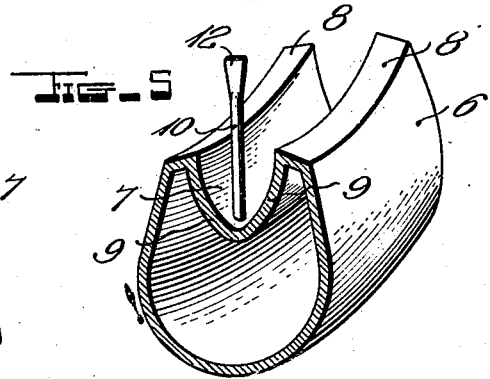
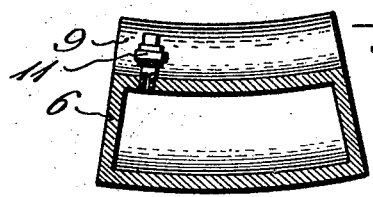
Inventor
Harry S. Williams
By H. B. Williams & Co.
Attorneys

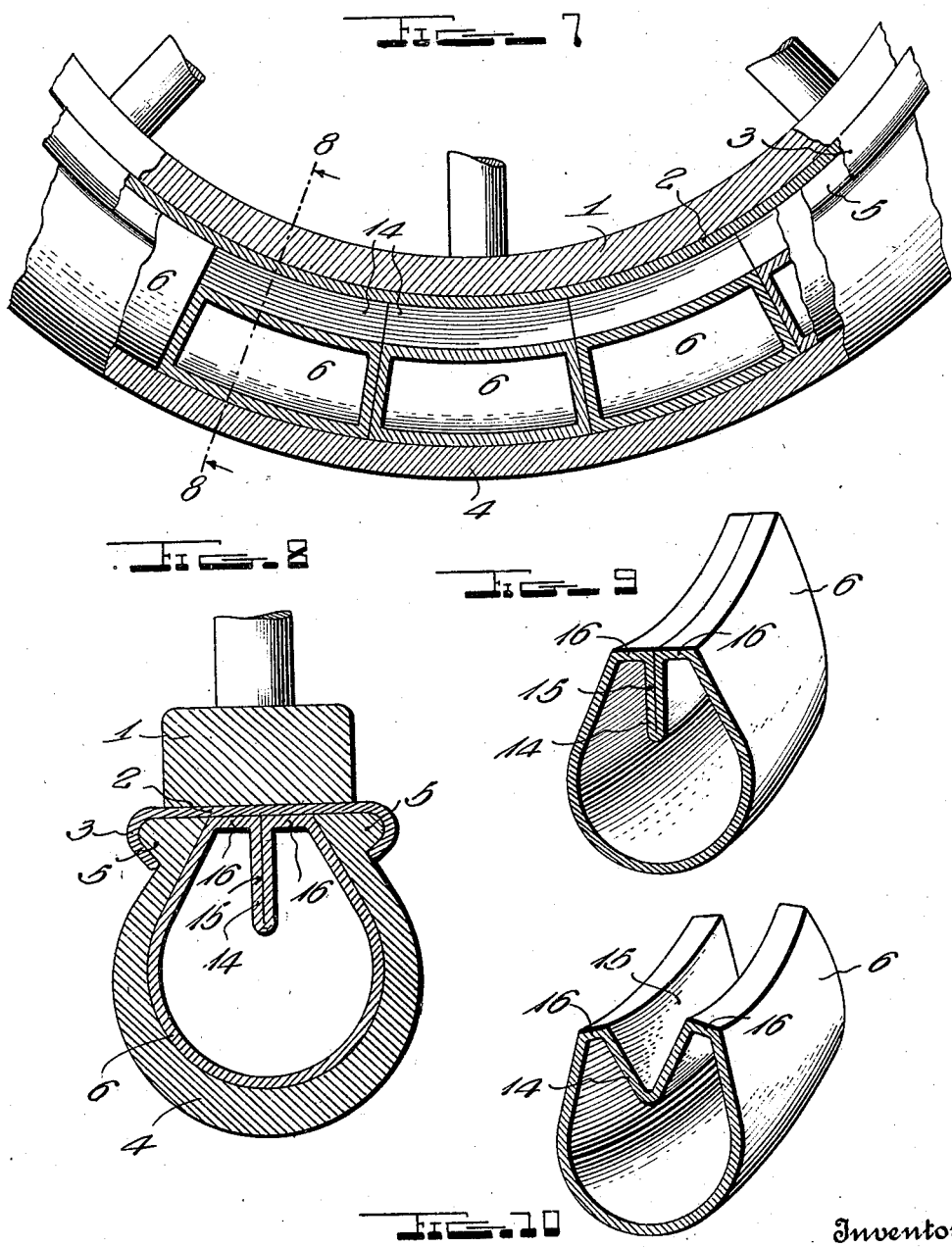

UNITED STATES PATENT OFFICE.

HARRY S. WILLIAMS, OF SAN ANTONIO, TEXAS, ASSIGNOR OF ONE-HALF TO OTTO KELLER, OF SAN ANTONIO, TEXAS.

PNEUMATIC TIRE.

1,379,887. Specification of Letters Patent. Patented May 31, 1921.

Application filed October 10, 1919. Serial No. 329,846.

*To all whom it may concern:*

Be it known that I, HARRY S. WILLIAMS, a citizen of the United States, residing at San Antonio, in the county of Bexar and State of Texas, have invented certain new and useful Improvements in Pneumatic Tires; and I do declare the following to be a full, clear, and exact description of the invention, such as will enable others skilled in the art to which it appertains to make and use the same.

This invention relates generally to tires for motor vehicles, and more particularly to pneumatic tires.

The primary object of the invention is to provide an improved pneumatic tire in which the air or other fluid is disposed in a plurality of cells or sections so that the tire as a whole will not become deflated in case one of these sections is punctured. The sections may be easily inserted in the tire or removed therefrom so that in case one of them is punctured it may be easily substituted by a new one at a convenient time.

Another object of the invention is to provide a pneumatic tire consisting of a plurality of inflated sections which are so constructed that they will serve to maintain the outer tire casing in proper position upon the rim of the wheel and thus eliminate the necessity of using special devices for this purpose.

A further object of the invention is to provide a pneumatic tire in which the air will not become unduly heated as in tires now in use. This feature consequently eliminates blow outs.

An additional object of the invention is to generally improve upon devices of this class by the provision of an extremely simple, strong, durable and inexpensive construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings forming a part of the specification and in which similar reference characters designate corresponding parts throughout the several views, Figure 1 is a longitudinal sectional view of a portion of a tire constructed in accordance with this invention, showing the same positioned upon the rim of a wheel;

Fig. 2 is a transverse sectional view through the rim and tire taken on the plane indicated by the line 2—2 of Fig. 1;

Fig. 3 is a sectional perspective view of one of the hollow tire sections, said view illustrating the shape of the section before it is inflated with air;

Fig. 4 is a longitudinal sectional view of one of the tire sections;

Fig. 5 is a sectional perspective view of one of the tire sections illustrating it as it appears when inflated;

Fig. 6 is a longitudinal sectional view of a slightly modified tire section;

Fig. 7 is a view similar to Fig. 1, illustrating a further modification of the invention;

Fig. 8 is a transverse sectional view taken on the plane indicated by the line 8—8 of Fig. 7;

Fig. 9 is a sectional perspective view of one of the tire sections shown in Figs. 7 and 8, said view illustrating the section as it appears before it is inflated; and, Fig. 10 is a similar view illustrating the section as it appears after it is inflated.

In the embodiment illustrated the numeral 1 designates the felly of a motor vehicle wheel upon which is mounted in the usual manner a clencher rim 2 having at its edges inturned flanges 3. Disposed upon the rim 2 is an outer tire casing 4, the edges of which are provided with the usual beads 5 engaged by the flanges 3 whereby the tire casing is maintained upon the rim.

Disposed within the tire casing 4 is a plurality of hollow tire sections 6. These sections 6 are curved longitudinally so that when a number of them are placed end to end a circular tire structure is formed. The cross sectional shape of the sections 6 conform to the interior tire casing 4 so as to completely fill the same. The rim sides of the sections are provided with longitudinally extending channels 7 whereby said rim sides are divided into a pair of rim engaging portions 8. In the forms shown in Figs. 1 to 6 of the drawings the walls 9 of the channels 7 are curved transversely and at the points where they join one another there are no well defined creases so that there is a tendency for the walls 9 to straighten out.

In Figs. 1 to 5 the sections 6 are provided with tubes 10 connected in any suitable manner at one of their ends to the walls of the channels 7 and capable of being bent longitudinally of the sections and confined entirely in said channels between the curved walls 9 thereof.

The section illustrated in Fig. 3 shows it as it appears before it is inflated. From this view it will be seen that the two rim engaging portions 8 are disposed comparatively close to each other. However, after the section is inflated by air or any other suitable fluid to the desired pressure and the free end of the tube 10 is squeezed together and cemented or otherwise closed as indicated by the numeral 12, the rim engaging portions 8 will be disposed a greater distance apart as shown in Fig. 5. This change of shape of the section is due to the pressure of the fluid within the section tending to decrease the depth of the channel 7 combined with the tendency of the walls 9 to straighten out.

In Fig. 6 the tube 10 has been substituted by a small size inflating valve 11 adapted to receive the tube of an inflating pump.

In the modified form of the invention shown in Figs. 7, 8, 9 and 10 the rim sides of the sections 6 are provided with inwardly projecting and longitudinally extending slit ridges 14. Before these sections 6 are inflated the two portions of the ridges 14 formed by the slits 15 are disposed in contact with one another as in Fig. 9, but when the sections are inflated the pressure of the air or whatever fluid is used will act so as to force the rim engaging portions 16 disposed on opposite sides of the ridges 14 away from one another as in Fig. 10 so that longitudinal channels 17 are formed between these rim engaging portions. The sections 6 shown in Figs. 7 to 10 may be inflated in any suitable manner.

In constructing a tire a number of the inflated sections 6 are used. A few of them are inserted end to end in the tire casing before the latter is placed upon the rim 2. The tire being placed upon the rim, the remainder of the sections 6 are then inserted in the tire casing, and the latter is disposed in proper position upon the rim 2, that is, the beads 5 are inserted beneath the flanges 3 by compressing or forcing the rim engaging portions 8 of the sections 6 together by an appropriate tool. The pressure of the air or other fluid contained in the sections 6 acting upon them in the manner above described so as to force the rim engaging portions 8 away from one another will serve to force the opposite sides of the tire casing 4 away from each other and cause the beads 5 of the tire casing to be locked beneath the flanges 3 of the rim. If desired, the adjacent sections 6 may be cemented together.

With a tire constructed as above described it will be seen that it cannot as a whole become deflated by a single puncture, as in case one of the sections 6 is punctured and deflated, the expansion of the air or other fluid in the other sections will tend to fill up the space. The punctured section can be substituted by a new one at any convenient time, it not being necessary to repair the tire or place the new section in the same immediately as is the case with ordinary pneumatic inner tubes. The sections 6 when punctured may be vulcanized the same as the ordinary inner tubes and they may be inflated and the tubes 10 closed and sealed in the manner above described. By having the air confined in a plurality of the sections it will not freely circulate and become unduly heated as is the case in ordinary tires, and hence the danger of blow outs which are due to a great extent to the heat expansion of the air in the tires has been eliminated. By constructing the sections with channels on their rim sides and with spaced rim engaging portions which under the pressure of the air or other fluid contained therein tend to move away from one another, the tire casing will be maintained in proper position upon the rim without the use of special means.

From the foregoing description taken in connection with the accompanying drawings, the construction, use and operation of the invention will be readily understood without a more extended explanation.

Various changes other than those above enumerated in form, proportion and in the minor details of construction may be resorted to without departing from the spirit of the invention as defined in the claims.

What is claimed is:

1. A device of the class described comprising a hollow arcuate tire section of a cross sectional shape to conform to the interior of a tire casing and provided on its rim side with a longitudinally extending channel dividing said rim side into a pair of rim engaging portions, the latter being disposed close together before said section is inflated and being separated by the pressure of the fluid in said section when the same is inflated.

2. A device of the class described comprising a hollow arcuate tire section of a cross sectional shape to conform to the interior of a tire casing and provided on its rim side with a longitudinally extending channel dividing said rim side into a pair of rim engaging portions, the latter being disposed close together before said section is inflated and being separated by the pressure of the fluid in said section when the same is inflated, the walls of said channel being transversely curved, and a tube secured at one end to said section adjacent the junction of the walls of the channel thereof and having its other end sealed shut after the tire section is inflated to retain air in the inflated tire section, said tube being adapted to be bent longitudinally with respect to said section and to be confined between the walls of the channel thereof.

3. A device of the class described comprising a hollow arcuate tire section of a cross sectional shape to conform to the interior of a tire casing and provided on its rim side with a longitudinally extending channel dividing said rim side into a pair of rim engaging portions, the latter being disposed close together before said section is inflated and being separated under the pressure of the fluid in said section when the same is inflated, the walls of said channel being transversely curved, a tube secured to said section and disposed between the walls of said channel, and means for closing the free end of said tube after the tire section is inflated to retain air in the inflated tire section.

4. A device of the class described comprising a rim provided at its edges with flanges, a tire casing mounted upon said rim and provided at its edges with beads disposed between said flanges, a plurality of hollow arcuate tire sections arranged end to end in said casing, said sections being of a cross sectional shape to conform to the interior of said casing and provided on their rim sides with longitudinally extending channels dividing said rim sides into pairs of rim engaging portions, the latter being disposed close together before said sections are inflated and pressing against and maintaining said beads engaged with the said flanges under the pressure of the fluid in said sections when the same are inflated, the walls of said channels being curved transversely, tubes secured to said sections and confined between the walls of said channels, and means for closing the free ends of said tubes.

In testimony whereof I have hereunto set my hand.

HARRY S. WILLIAMS.